(12) United States Patent
Kameno et al.

(10) Patent No.: US 6,472,787 B1
(45) Date of Patent: Oct. 29, 2002

(54) CONTROLLER OF MAGNETIC BEARING

(75) Inventors: Hironori Kameno, Nara (JP); Hirochika Ueyama, Hirakata (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/786,316

(22) PCT Filed: Jul. 21, 2000

(86) PCT No.: PCT/JP00/04912

§ 371 (c)(1), (2), (4) Date: Mar. 2, 2001

(87) PCT Pub. No.: WO01/09529

PCT Pub. Date: Feb. 8, 2001

(30) Foreign Application Priority Data

Jul. 29, 1999 (JP) ............................................ 11-215461

(51) Int. Cl.[7] .............................................. F16C 32/04
(52) U.S. Cl. ...................................................... 310/90.5
(58) Field of Search ........................................ 310/90.5

(56) References Cited

U.S. PATENT DOCUMENTS 5,760,510 A * 6/1998 Nomura et al. ............. 310/90.5

FOREIGN PATENT DOCUMENTS

| JP | 1-206116 | 8/1989 | ............ F16C/32/04 |
| JP | 6-12827 | 2/1994 | ............ F16C/32/04 |
| JP | 8-166019 | 6/1996 | ............ F16C/32/04 |

* cited by examiner

*Primary Examiner*—Burton S. Mullins
(74) *Attorney, Agent, or Firm*—Smith, Gambrell & Russell, LLP

(57) ABSTRACT

In a control unit for magnetic bearing, a sampling frequency of a DSP 4 is varied according to a number of rotation of a rolling element 1. Thus, a frequency band to be damped by a notch filter 42 as a digital filter is varied in correspondence with a resonance frequency associated with a natural frequency and a rotational vibration frequency, thereby to damp a resonance signal contained in a control signal. The occurrence of resonance is thus prevented through digital control.

2 Claims, 3 Drawing Sheets

CONTROLLER OF MAGNETIC BEARING

TECHNICAL FIELD

The present invention relates to a control unit for magnetic bearing.

BACKGROUND ART

A rolling element rotated as supported by a magnetic bearing in non-contact fashion encounters resonance if an increasing rotational vibration frequency coincides with a natural frequency when, for example, the rolling element is brought from a stationary state into a start-up state increasing a number of rotation. Due to a so-called gyroscopic action, the natural frequency of the rolling element varies with increase or decrease in the number of rotation thereof.

In order to prevent such resonance as mentioned above, a control unit for magnetic bearing, as disclosed in an official gazette of Japanese unexamined patent publication 63(1988)-275814, is arranged such that a voltage-variable notch filter is interposed between a magnetic-bearing output circuit and a power amplifier for power supply to the magnetic bearing. The voltage-variable notch filter is adapted for sequential variation of a central frequency thereof through voltage, which is obtained through F/V conversion of the number of rotation of the rolling element. The central frequency of the notch filter is so controlled as to vary in correspondence with the natural frequency varying with increase or decrease in the number of rotation of the rolling element. As a result, a resonance signal at the same frequency with the natural frequency is eliminated and thus, the resonance is prevented.

The above conventional control unit for magnetic bearing is totally composed of analog circuitry. However, a control unit principally composed of digital signal processing circuitry is becoming predominant recently. One of the features of the control unit principally composed of the digital signal processing circuitry is that all but an input and an output portions are involved in digital processings. If the above voltage-variable notch filter is provided, however, this portion must be provided as an additional analog circuit. This constitutes a problem of complicated circuit configuration.

In view of the foregoing problem encountered in the art, the present invention has an object to provide a control unit for magnetic bearing adapted to prevent the occurrence of resonance by way of digital control.

DISCLOSURE OF THE INVENTION

A control unit for magnetic bearing in accordance with the present invention comprises: number-of-rotation sensing means for sensing a number of rotation of a rolling element supported by a magnetic bearing; sampling frequency decision means for varying a sampling frequency according to variation of the number of rotation sensed by the number-of-rotation sensing means; displacement sensing means for sensing a displacement of the rolling element and outputting a digital displacement signal based on a sensed displacement; control means for outputting a control signal for positional control of the rolling element based on the digital displacement signal outputted from the displacement sensing means, the control means performing a predetermined digital filtering processing at the sampling frequency provided by the sampling frequency decision means thereby varying a cutoff frequency according to the sampling frequency, to output the control signal with a damped frequency band including a resonance frequency associated with a natural frequency varying with the number of rotation of the rolling element and a rotational vibration frequency; and electromagnet control means for controlling an electromagnet of the magnetic bearing based on the control signal outputted from the control means.

In the control unit for magnetic bearing arranged as mentioned above, the sampling frequency decision means varies the sampling frequency according to the variation of the number of rotation. The control means for outputting the control signal for positional control of the rolling element performs the predetermined digital filtering processing at the sampling frequency thereby varying the cutoff frequency according to the variation of the sampling frequency. Thus, the frequency band to be "cut off" is varied in correspondence with the resonance frequency associated with the natural frequency corresponding to the number of rotation of the rolling element and the rotational vibration frequency, so that outputted is the control signal with the damped frequency band which includes the resonance frequency. Consequently, the resonance signal is eliminated and thus, the resonance can be prevented.

In the aforementioned control unit, the sampling frequency decision means may decide the sampling frequency according to the data table.

In this case, if the data table is changed, the variation characteristics of the sampling frequency are varied and hence, the variation characteristics of the cutoff frequency are varied, as well. Therefore, even if the characteristics of the natural frequency of the rolling element vary, the resonance signal can be damped by accordingly changing the data table or varying the cutoff frequency. Therefore, if the variation characteristics of the cutoff frequency are selected to meet the condition of use of the rolling element (for instance, the type of tool to be connected in a case where the rolling element is a spindle for use in the machine tool), the resonance can be prevented in any of the various conditions of use of the rolling element.

BEST MODES FOR CARRYING OUT THE INVENTION

Figure 1:
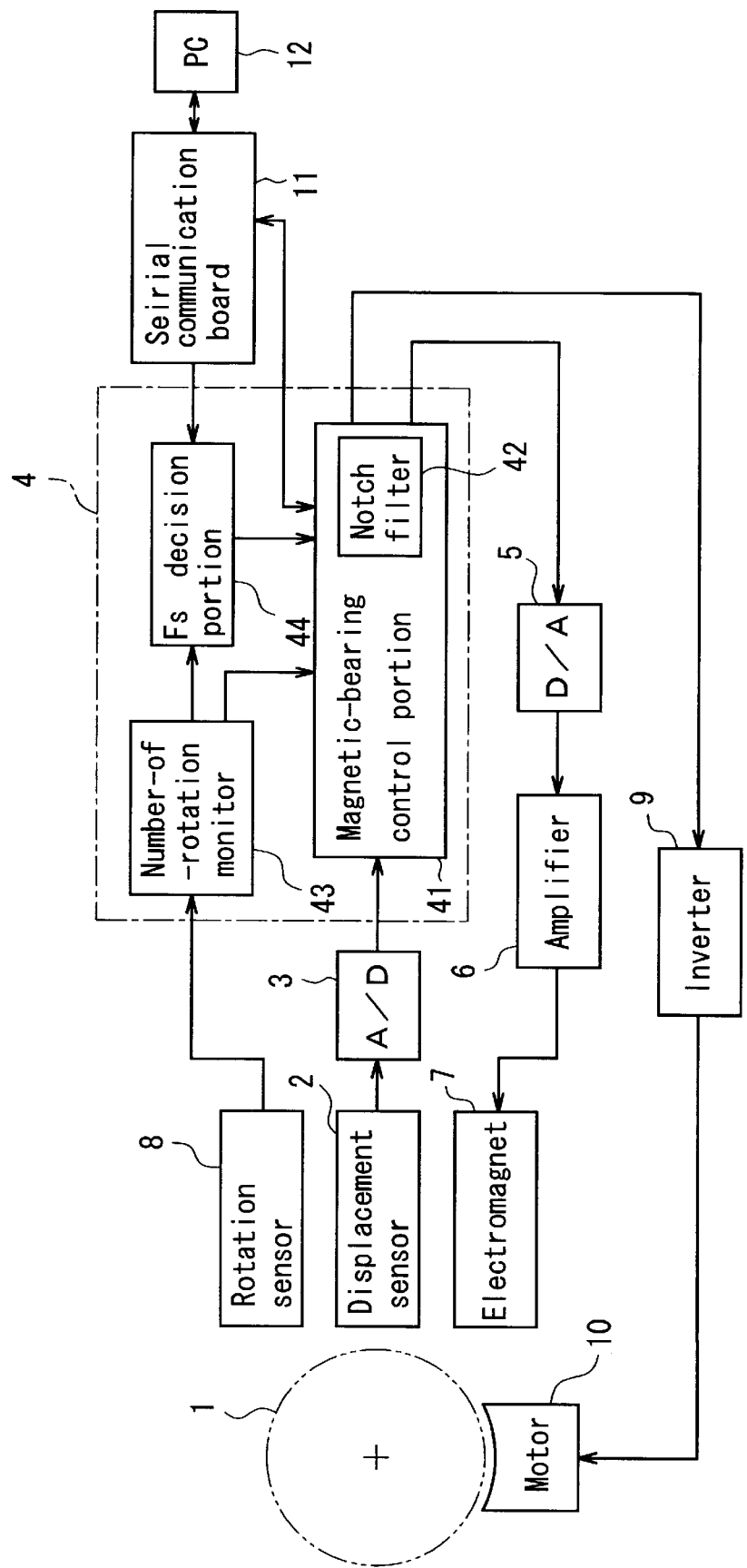
FIG. 1 is a block diagram showing a control unit for magnetic bearing according to one embodiment of the present invention.

FIG. 1 is a block diagram showing an arrangement of a control unit for magnetic bearing according to one embodiment of the present invention. Referring to the figure, a rolling element 1 is driven by a motor 10 for high-speed rotation as supported by a magnetic bearing in non-contact fashion. A displacement of the rolling element 1 is sensed by a displacement sensor 2. An analog displacement signal outputted from the displacement sensor 2 is converted to a digital displacement signal by an A/D converter 3 and inputted to a DSP (digital signal processor) 4. Based on the input digital displacement signal, the DSP 4 outputs a digital control signal for control of an electromagnet of the magnetic bearing. A D/A converter 5 converts this control signal to an analog current command signal and supplies the resultant signal to an amplifier 6. The amplifier 6 obtains a control current by amplifying this signal so as to supply the control current to the electromagnet 7 of the magnetic bearing. Receiving the control current, the electromagnet 7 provides positional control of the rolling element 1.

The DSP 4 includes, as functional portions accomplished by software, a magnetic-bearing control portion 41 for outputting the aforesaid digital control signal, a number-of-rotation monitor 43, and a sampling frequency (represented as "Fs") decision portion 44. The magnetic-bearing control portion 41 includes a notch filter 42 as a digital filter constituted by a software. The DSP 4 is communicatively connected with a personal computer 12 via a serial communication board 11. It is noted that the DSP 4 has a memory incorporated therein as well as a required external memory connected thereto but the illustration of these memories is dispensed with. Written to these memories are an operation program for the DSP 4 and control parameters as well as a data table to be described hereinlater.

A rotation sensor 8, which is disposed in the vicinity of the rolling element 1, outputs a pulse according to the number of rotation of the rolling element 1. The output pulse is input to the number-of-rotation monitor 43. Receiving the pulse, the number-of-rotation monitor 43 determines a number of rotation of the rolling element 1 from an inverse number of a time interval of the pulse inputs, for example. The resultant number of rotation is sent to the sampling frequency decision portion 44 and is also fed back to the magnetic-bearing control portion 41. A number-of-rotation command signal is generated by the DSP 4 and sent to an inverter 9. Based on this signal, the inverter 9 controls the rotation of the motor 10. Referring to the data table, the sampling frequency decision portion 44 decides a sampling frequency Fs in correspondence with the number of rotation.

Next, a detailed description will be made on principal operations related to the present invention.

Figure 2:
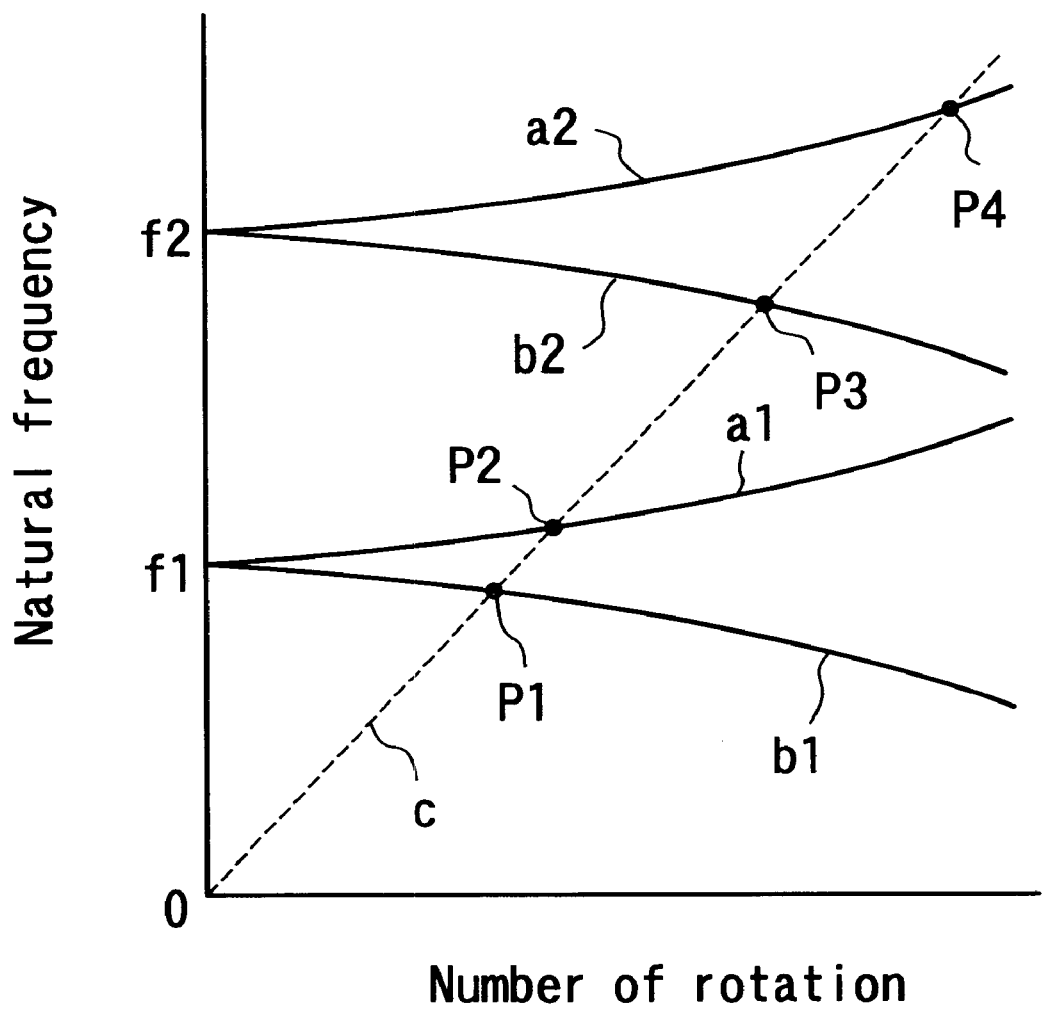
FIG. 2 is a graph representing the relationship between the number of rotation of a rolling element supported by the magnetic bearing and the natural frequency thereof.
Figure 3:
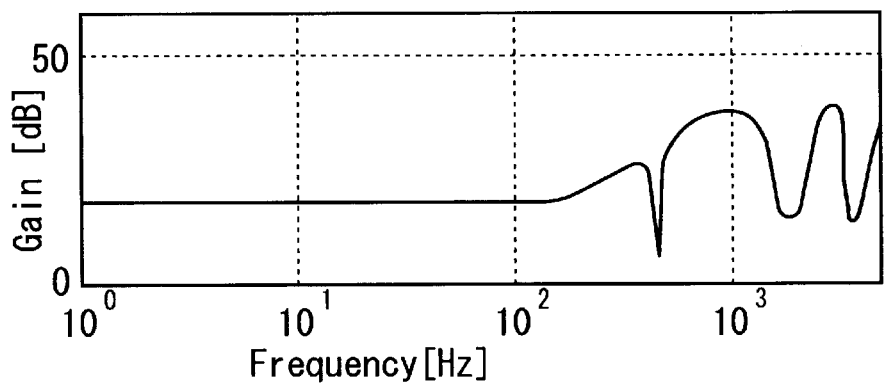
FIG. 3 is a graph representing the frequency characteristics of a notch filter of the above control unit with a sampling frequency varied as a parameter and showing an example where the sampling frequency Fs is at 4 kHz.
Figure 4:
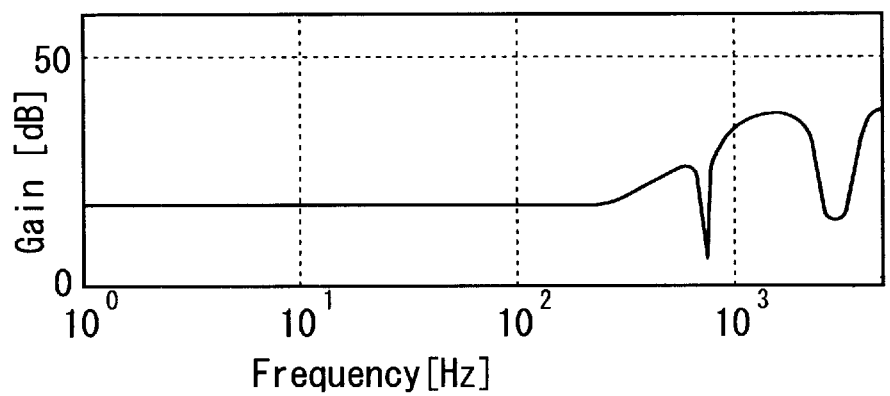
FIG. 4 is a graph similar to that of FIG. 3, showing an example where the sampling frequency Fs is at 6 kHz.
Figure 5:
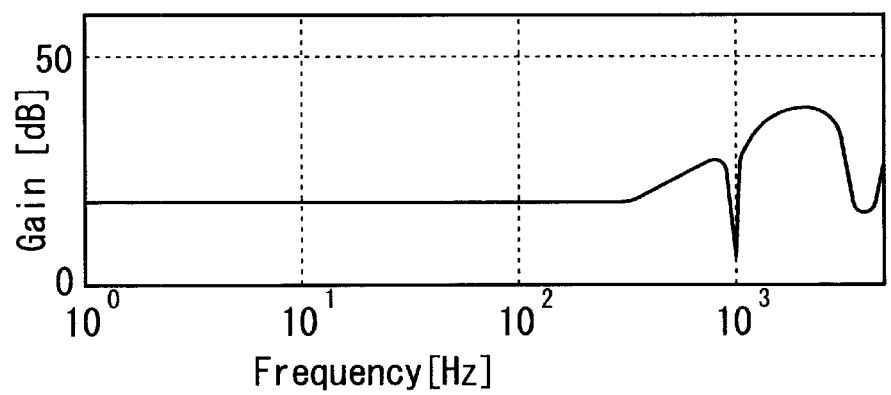
FIG. 5 is a graph similar to that of FIG. 3, showing an example where the sampling frequency Fs is at 8 kHz.
Figure 6:
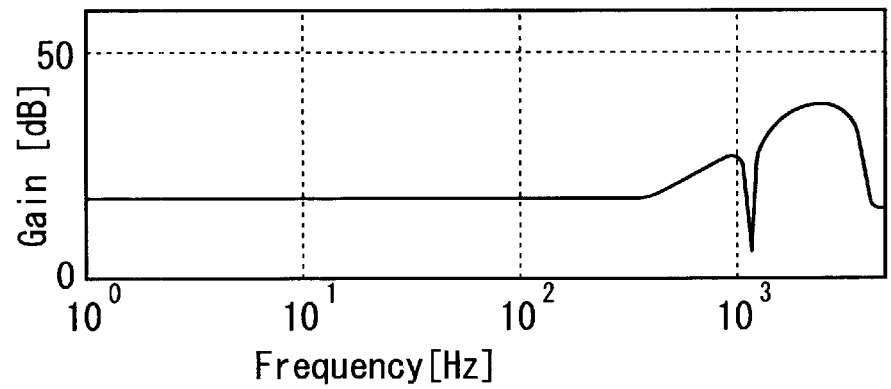
FIG. 6 is a graph similar to that of FIG. 3, showing an example where the sampling frequency Fs is at 10 kHz.

FIG. 2 is a graph representing the relationship between the number of rotation and the natural frequency of the rolling element 1. Referring to the figure, a natural frequency based on a primary bending moment is at a fixed value f1 when the rolling element 1 is stationary. However, this natural frequency is divided into a forward natural frequency a1 and a backward natural frequency b1 due to the gyroscopic action as the rolling element 1 is increased in the number of rotation. Likewise, a natural frequency based on a secondary bending moment is at a fixed value f2 when the rolling element 1 is stationary. However, this natural frequency is divided into a forward natural frequency a2 and a backward natural frequency b2 due to the gyroscopic action as the rolling element 1 is increased in the number of rotation. As shown by a characteristic curve c, on the other hand, the rotational vibration frequency linearly increases at a constant gradient with increase in the number of rotation of the rolling element 1. As a result, resonance occurs at respective intersection points P1, P2, P3 and P4. Provided that the numbers of rotation and the natural frequencies at these intersection points are represented as P1(Np1, fp1), P2(Np2, fp2), P3(Np3, fp3) and P4(Np4, fp4), the notch filter 42 must be controlled by the DSP 4 such that the central frequencies of the notch filter 42 at the numbers of rotation of Np1, Np2, Np3 and Np4 coincide with the natural frequencies fp1, fp2, fp3 and fp4, respectively.

Since the notch filter 42 performs a digital filtering processing based on sample data on time sequence, a cutoff frequency of the notch filter has a close relationship with the sampling frequency Fs. FIG. 3 to FIG. 6 are graphs each showing frequency characteristics of a gain of the notch filter 42 when the sampling frequency Fs is varied as the parameter. FIG. 3, FIG. 4, FIG. 5 and FIG. 6 respectively illustrate exemplary cases where the sampling frequency Fs is at 4 kHz, 6 kHz, 8 kHz and 10 kHz in this order. As apparent from FIG. 3 to FIG. 6, the cutoff frequencies present in the vicinity of the central frequencies of "notches" increase or decrease in response to increase or decrease of the sampling frequency Fs. Therefore, the cutoff frequency and the central frequency of the notch filter 42 can be varied, as desired, by properly increasing or decreasing the sampling frequency Fs.

Then, the sampling frequency decision portion 44 is provided with a data table based on empirical actual measurements such that the sampling frequency Fs is varied according to the data table for bringing each central frequency of the notch filter 42 at each of the numbers of rotation Np1, Np2, Np3 and Np4 into coincidence with each of the aforesaid natural frequencies fp1, fp2, fp3 and fp4. Thus, a resonance signal coincident with the natural frequency can be damped by deciding the sampling frequency Fs corresponding to the number of rotation N, thereby to prevent the occurrence of resonance. Specifically, in starting the rolling element 1, the DSP 4 causes the rolling element 1 to be levitated to a target position using a predetermined DSP constant such as a control parameter. At this time, the DSP 4 has its sampling frequency Fs decided based on the natural frequencies f1 and f2 (FIG. 2) of the rolling element 1, the number of rotation of which is at 0. Subsequently, the DSP 4 controls the inverter 9 for driving the motor 10. This brings the rolling element 1 into rotation. The rotation of the rolling element 1 causes the rotation sensor 8 to output a pulse while the number-of-rotation monitor 43 senses the number of rotation N. The sampling frequency decision portion 44 reads the data table such as shown in the following table 1, for instance.

TABLE 1

| Number of rotation [rps] | | Sampling |
| --- | --- | --- |
| During increase | During decrease | frequency Fs [kHz] |
| 0 ≦ N < 120 | 0 ≦ N ≦ 100 | 6 |
| 120 ≦ N < 150 | 100 < N ≦ 145 | 6.1 |
| 150 ≦ N < 180 | 145 < N ≦ 175 | 6.2 |
| 180 ≦ N < 210 | 175 < N ≦ 205 | 6.3 |
| 210 ≦ N < 240 | 205 < N ≦ 235 | 6.4 |
| 240 ≦ N < 270 | 235 < N ≦ 265 | 6.5 |
| 270 ≦ N < 300 | 265 < N ≦ 295 | 6.6 |
| 300 ≦ N | 295 < N ≦ 325 | 6.7 |

At the start-up of the rolling element 1, the sampling frequency Fs[kHz] is decided based on the range of the number of rotation N [rps] shown in the column "During increase" of Table 1. When 0≦N<120, for example, the sampling frequency-is decided as Fs=6. When 120≦N<150, Fs=6.1. In a similar manner, the sampling frequency Fs increases with increase in the number of rotation N. The sampling frequencies Fs sequentially decided in this manner are supplied to the magnetic-bearing control portion 41. Thus, the magnetic-bearing control portion 41 samples the outputs from the A/D converter 3 at the supplied sampling frequency Fs.

The resonance signals coincident with the natural frequencies fp1, fp2, fp3 and fp4 are damped by deciding the sampling frequency Fs in correspondence with the number of rotation N and hence, the occurrence of resonance can be prevented.

On the other hand, when the rotation of the rolling element 1 is to be stopped, the sampling frequency Fs[kHz] is decided based on the range of the number of rotation N [rps] shown in the column during decrease, of Table 1. When $295<N\leq325$, for example, Fs=6.7 and when $265<N\leq295$, Fs=6.6. As shown in Table 1, the other sampling frequencies Fs are decided based on the ranges of N which are different from those for the time of increase in the number of rotation. By differing threshold values for the time of increase in the number of rotation from those for the time of decrease in the number of rotation in this manner, hysteresis can be prevented.

Likewise to the time of increase in the number of rotation, the resonance signals coincident with the natural frequencies fp1, fp2, fp3 and fp4 are also damped by deciding the sampling frequency FS in correspondence with the number of rotation N that is decreased and thus, the occurrence of resonance is prevented.

In the aforesaid control unit, the rotation sensor 8 and the number-of-rotation monitor 43 constitute number-of-rotation sensing means for sensing the number of rotation of the rolling element 1 supported by the magnetic bearing. The sampling frequency decision portion 44, in combination with the data table, constitutes sampling frequency decision means for varying the sampling frequency Fs according to the variation of the number of rotation. The displacement sensor 2 and the A/D converter 3 constitute displacement sensing means for sensing the displacement of the rolling element 1 and outputting the digital displacement signal based on the sensed displacement. The magnetic-bearing control portion 41 constitutes control means which, based on the digital displacement signal, outputs the control signal for positional control of the rolling element 1. The magnetic-bearing control portion 41 further constitutes control means which performs the predetermined digital filtering processing based on the sampling frequency thereby varying the cutoff frequency according to the sampling frequency so as to output the control signal with a damped frequency band including the resonance frequency associated with the natural frequency varying with the number of rotation of the rolling element 1 and the rotational vibration frequency. The D/A converter 5 and the amplifier 6 constitute electromagnet control means for controlling the electromagnet 7 of the magnetic bearing based on the control signal.

It is noted that the data table containing the numbers of rotation N and the sampling frequencies Fs is not limited to the above and may also be changed by giving instructions from the personal computer 12. This provides for the prevention of resonance in various conditions of use of the rolling element 1 if the variation characteristics of the cutoff frequency are selected according to the condition of use of the rolling element 1 (such as, for example, the type of tool to be connected to the rolling element 1 in a case where the rolling element is a spindle in a machine tool).

What is claimed is:

1. A control unit for magnetic bearing comprising:
   number-of-rotation sensing means for sensing a number of rotation of a rolling element supported by a magnetic bearing;
   sampling frequency decision means for varying a sampling frequency according to variation of the number of rotation sensed by said number-of-rotation sensing means;
   displacement sensing means for sensing a displacement of said rolling element and outputting a digital displacement signal based on a sensed displacement;
   control means for outputting a control signal for the positional control of said rolling element based on the digital displacement signal outputted from said displacement sensing means, said control means performing a predetermined digital filtering processing at the sampling frequency provided by said sampling frequency decision means thereby varying a cutoff frequency according to the sampling frequency, to output the control signal with a damped frequency band including a resonance frequency associated with a natural frequency varying with the number of rotation of said rolling element and a rotational vibration frequency; and
   electromagnet control means for controlling an electromagnet of the magnetic bearing based on the control signal outputted from said control means.

2. The control unit for magnetic bearing as claimed in claim 1, wherein said sampling frequency decision means decides the sampling frequency according to a data table.

* * * * *